June 14, 1949. H. J. FINDLEY 2,473,281
VENTILATING AND HEATING APPARATUS FOR VEHICLES
Filed March 15, 1945 3 Sheets-Sheet 1
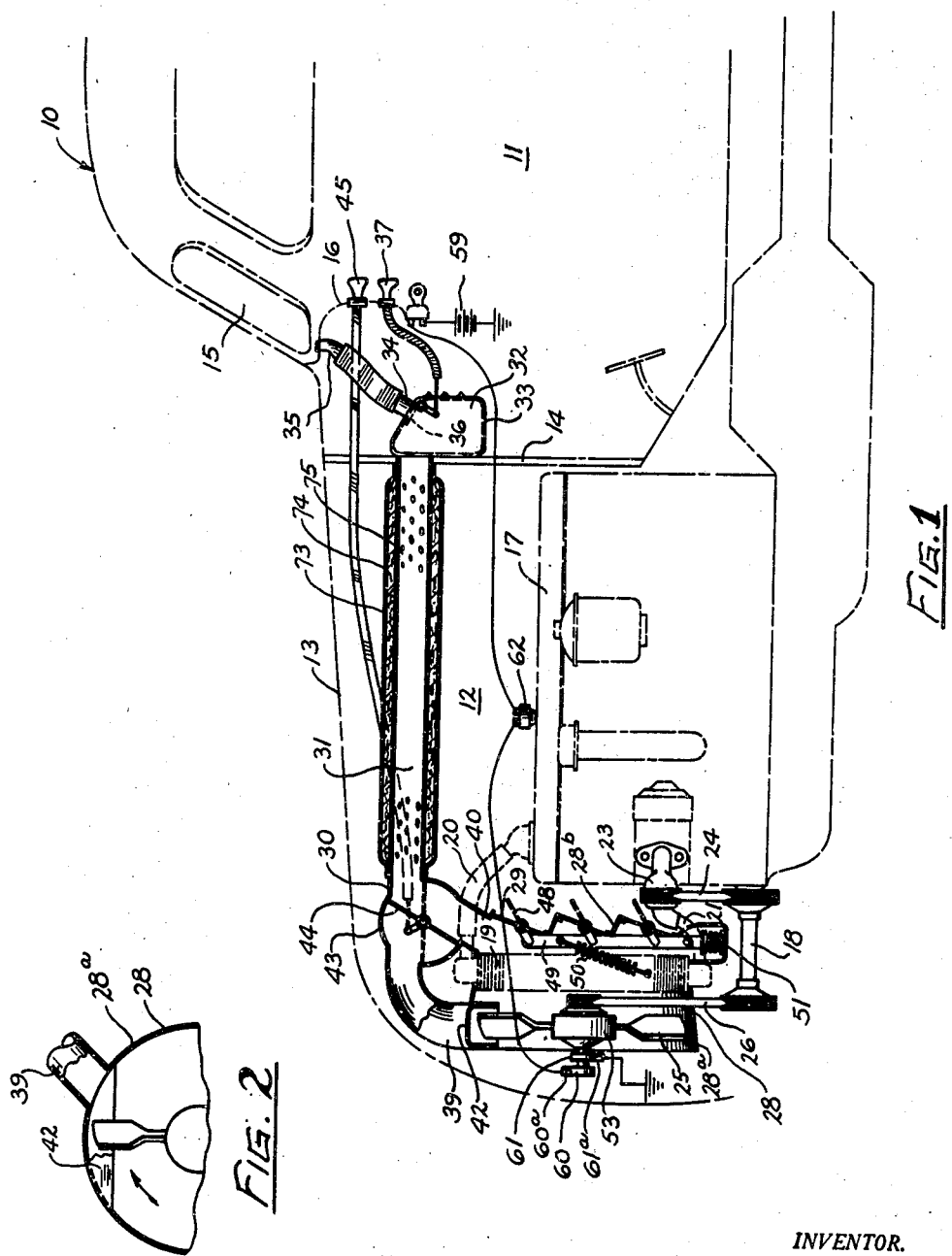
INVENTOR.
HOWARD J. FINDLEY
BY
Kwis Hudson Boughton & Williams
ATTORNEYS

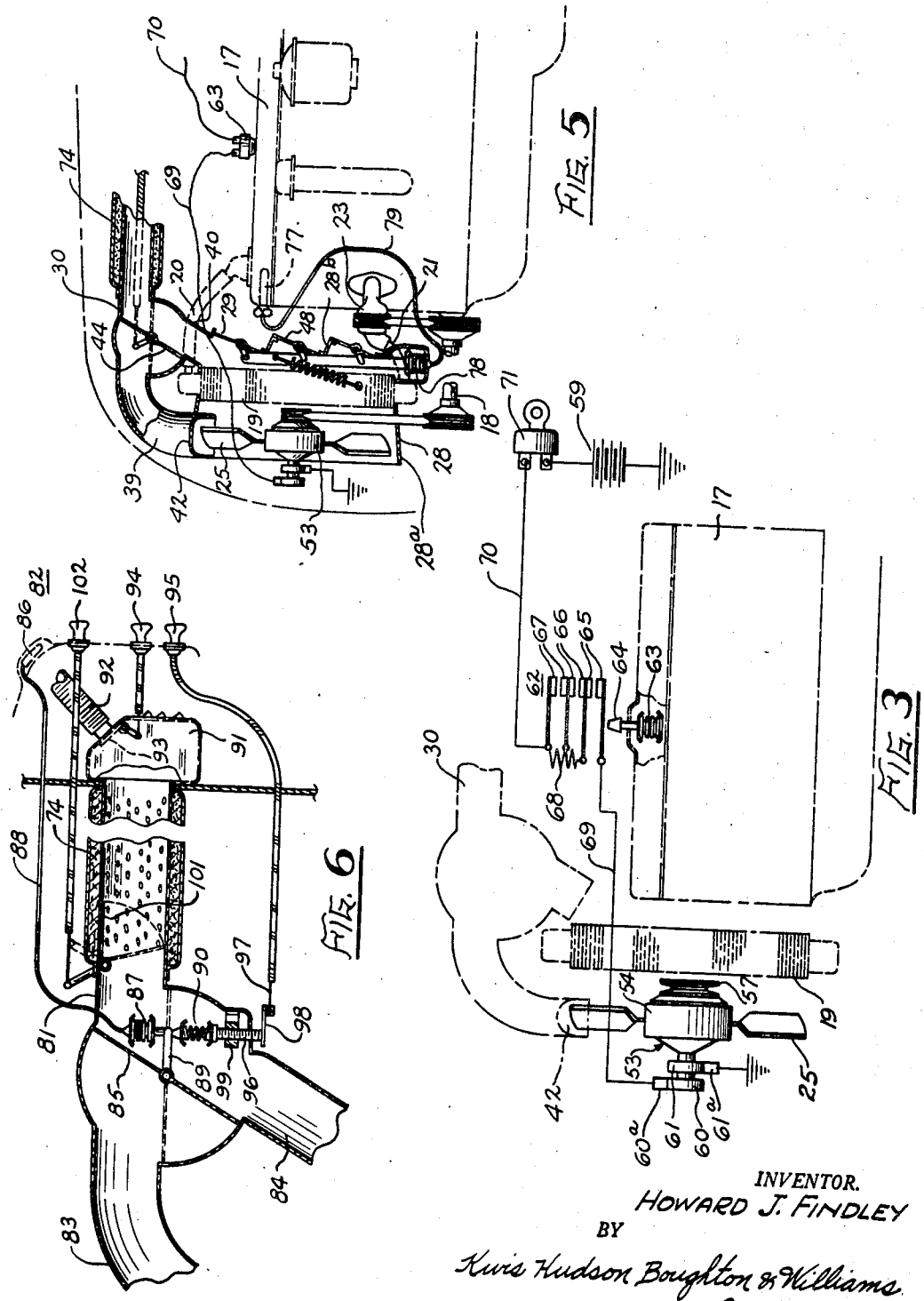

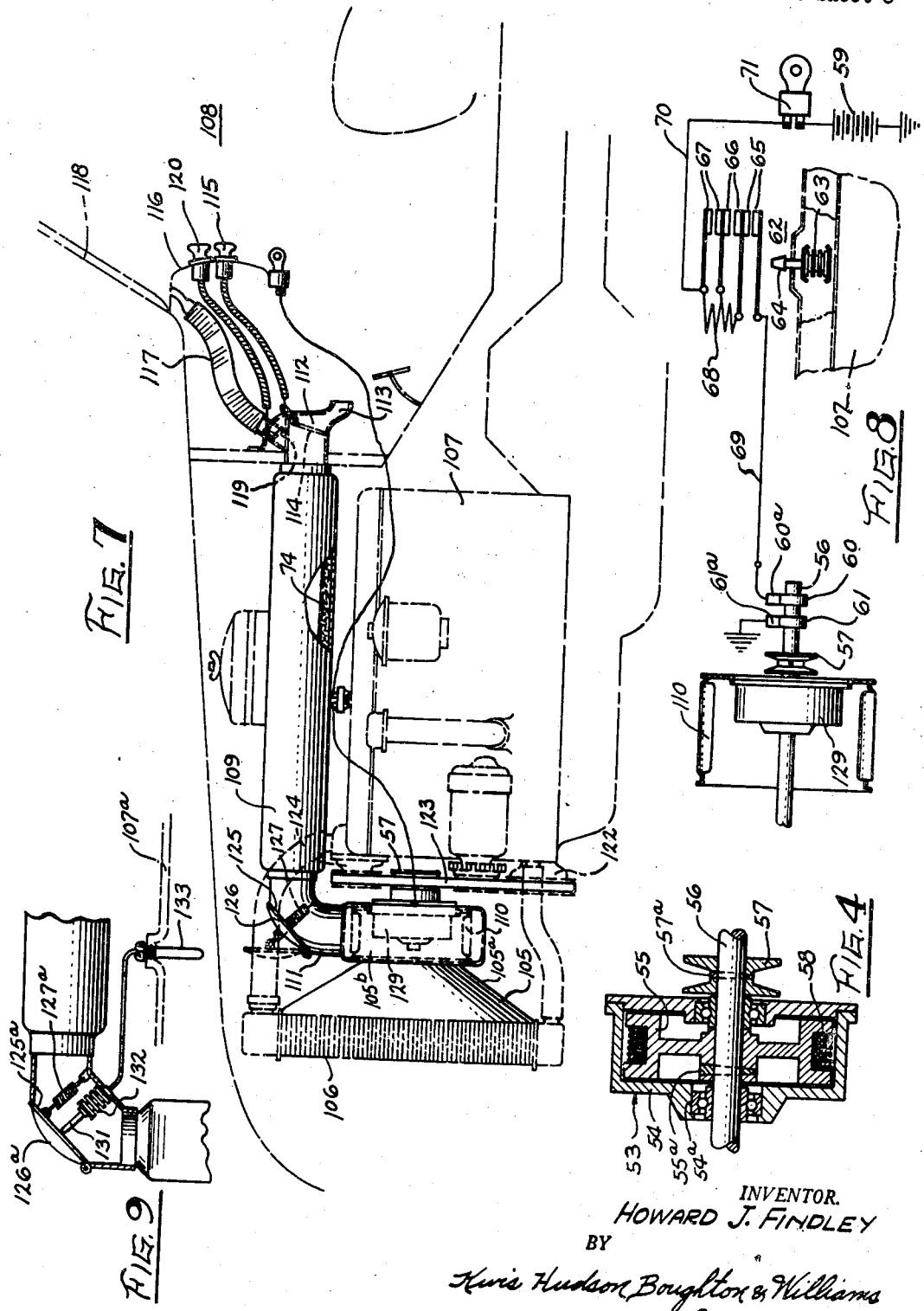

Patented June 14, 1949

2,473,281

UNITED STATES PATENT OFFICE 2,473,281

VENTILATING AND HEATING APPARATUS FOR VEHICLES

Howard J. Findley, Chardon, Ohio, assignor to Eaton Manufacturing Company, Cleveland, Ohio, a corporation of Ohio Application March 15, 1945, Serial No. 582,977

6 Claims. (Cl. 237—2)

This invention relates to the ventilating and heating of automobiles and other motor vehicles and aims to provide improved apparatus for this purpose which will operate in an efficient and satisfactory manner in conjunction with the cooling apparatus of the vehicle driving engine.

For a considerable period of time it has been customary to provide the internal combustion driving engines of motor vehicles with a cooling means, usually in the form of a radiator adapted to contain cooling liquid and a fan driven from the engine and operable to cause a flow of air through the radiator. Thermostatic valves or so-called thermostats are usually located in the liquid passages to prevent the circulation of the cooling liquid until the engine has attained a desired operating temperature. It has also been customary to provide motor vehicles with heaters for their passenger compartments, and such heaters frequently include a heat-exchange core to which liquid is supplied from the engine cooling system and a fan operated by current from the vehicle battery for causing a flow of air through the core.

On cold days and when the heater is being used, the thermostats of the cooling system will open only a small amount, if at all, and the flow of cooling liquid through the radiator may consist only of the leakage past the thermostats which the thermostat manufacturers go to considerable trouble and expense to keep at a minimum. Under the conditions just mentioned, the cooling of the engine is accomplished mainly by the circulation of the cooling liquid through the heat-exchange core of the heater. In the case of motor vehicles equipped with such an engine cooling radiator and fan and with a heater core and fan, it will be seen that there is a duplication of equipment as well as a wasteful expenditure of power in the simultaneous operation of the engine cooling fan and the heater fan. It is well known also that the usual engine cooling fan absorbs a substantial percentage of the horsepower developed by the engine, and that for vehicle speeds above 50 miles per hour or on cold days when the thermostats of the cooling system do not open, this represents wasted power.

It is, therefore, another object of the present invention to provide improved vehicle ventilating and heating apparatus in which the engine cooling radiator and fan are also used for supplying air of the desired temperature to the passenger compartment of the vehicle so as to avoid a duplication of equipment as well as a drain on the vehicle battery.

Still another object of the invention is to provide improved ventilating and heating apparatus of this character having air passages and valve means arranged for controlling the amounts of cold and warm air to be supplied to the vehicle compartment and wherein valve-controlled discharge means permits the escape of air which is delivered by the engine cooling fan in excess of that needed for the vehicle compartment.

A further object of this invention is to provide improved vehicle ventilating and heating apparatus of this character, in which the use of the engine cooling fan to supply air to the passenger compartment assures the delivery of an adequate but not excessive volume of air to the compartment and wherein the drive for the fan includes a coupling which operates so that the speed of the fan can be varied in accordance with changes in the operating temperature of the engine.

Yet another object of this invention is to provide improved apparatus of the character mentioned, in which the valve means controlling the discharge for the air being delivered in excess of that needed for the vehicle compartment is adapted to be actuated automatically in response to changes in the temperature of the vehicle engine or radiator.

The invention can be further briefly summarized as consisting in certain novel combinations and arrangements of parts hereinafter described and particularly set out in the appended claims.

In the accompanying sheets of drawings

Fig. 1 is a view showing the improved ventilating and heating apparatus in longitudinal section and applied to a motor vehicle;

Fig. 2 is a detached detail view partly in section, showing one of the connections for enabling the engine cooling fan to deliver air to the vehicle compartment.

Fig. 3 is a view mainly in elevation and more or less diagrammatic in form showing the electric circuit for controlling the coupling embodied in the drive for the engine cooling fan;

Fig. 4 is a longitudinal sectional view taken through the coupling of the fan drive;

Fig. 5 is a partial longitudinal sectional view similar to Fig. 1 but showing a modified form of the ventilating and heating apparatus;

Fig. 6 is a partial longitudinal sectional view showing another modified form of the ventilating and heating apparatus;

Fig. 7 is an elevational view with portions thereof broken away, showing still another modified form of ventilating and heating apparatus constructed according to the present invention;

Fig. 8 is a diagrammatic view illustrating the electric circuit for the coupling embodied in the drive for the cooling fan of the apparatus of Fig. 7; and Fig. 9 is a detail view partly in section, showing a modified construction for the valve-controlled air discharge embodied in the apparatus of Fig. 7.

In the form of the invention illustrated in Fig. 1 there is shown an automobile 10 having therein a passenger compartment 11 and an engine compartment 12, the latter being located under the hood 13 and separated from the passenger compartment by the dashboard 14. The passenger compartment is provided with a windshield 15 and also contains an instrument panel 16 located adjacent the base of the windshield. A driving engine 17 in the form of a conventional internal combustion engine or motor is located in the engine compartment 12 and is provided at one end, in this case its forward end, with a driven shaft 18 for operating auxiliary devices which will be referred to presently. The driving engine 17 is also provided with a cooling radiator 19 which is here shown as being located adjacent the forward end of the engine compartment 12 and which contains water or other cooling liquid.

The radiator 19 is of a conventional construction having numerous openings for the passage of air therethrough in heat-exchange relation to the cooling liquid. The radiator is connected with the engine 17 by the usual supply and return conduits 20 and 21 through which the cooling liquid is circulated. A pump 23 located in, or connected with, the return conduit 21 operates to circulate the cooling liquid between the engine 17 and the radiator 19 and constitutes one of the auxiliary devices adapted to be driven from the power take-off 18. The pump 23 is connected with the power take-off 18 as by means of the belt 24.

Another of the auxiliary devices driven from the power take-off 18 is the engine cooling fan or impeller 25 which constitutes an important part of the improved ventilating and heating apparatus as will be explained in greater detail hereinafter. This impeller is driven from the power take-off 18 by torque transmitting means which includes the belt 26 and a coupling 53 which will be described later. The impeller 25 accomplishes two main functions, namely, to cause a flow of cooling air through the radiator 19 and to cause air to be supplied in an adequate volume to the vehicle compartment 11.

In the embodiment of the invention now being described (Fig. 1), the impeller 25 is a propeller type fan and is located in front of the radiator 19, although it can be otherwise constructed and located. A hollow structure 28 located adjacent to or connected with the radiator 19 confines or directs the air flow created by the impeller 25 so as to render substantially all of the air available for cooling the engine or conditioning the compartment 11. A conduit 30 extends rearwardly from the hollow structure 28 to the compartment 11 and provides a delivery passage 31 through which the air for the compartment is delivered. The hollow structure 28 can be a housing or shell in which the radiator 19 is located or may comprise a plurality of sections located adjacent the radiator, such as the sections here shown which include a suitably shaped supply section or shroud 28a extending forwardly of the radiator and in which the impeller 25 is operable, and a delivery section 28b located on the opposite side or to the rear of the radiator. The supply section 28a forms an air passage leading to the openings of the radiator 19 and also forms a housing for the air impeller 25. The delivery section 28b receives the air which has passed through the radiator 19 and has one or more discharge or exhaust openings 29 through which air in excess of that needed for the compartment 11 is discharged, as will be presently explained more in detail.

The conduit 30 opens into the compartment 11 either directly, or as here shown, through a distributing box or fitting 32. The box 32 has one or more air delivery openings 33 communicating with the compartment 11 and may also have a delivery opening 34 with which a defrosting nozzle 35 is connected. The nozzle 35 is located adjacent the base of the windshield 15 so as to direct air against the latter for clearing or defrosting purposes. The supply of air to the defrosting nozzle 35 can be controlled by a valve 36 adapted to be actuated by means of a knob 37 located on the instrument panel 16.

The forward end of the conduit 30 has inlet connections 39 and 40 which are connected respectively with the supply and delivery sections 28a and 28b of the structure 28. The inlet connection 39 admits cold air to the conduit 30, that is to say, air which has not passed through the radiator 19, and the inlet connection 40 admits to the conduit 30 air which has been heated by passage through the radiator. The cold air supplied through the inlet connection 39 is a portion of the air being delivered by the impeller 25, and when the impeller is a propeller type fan as here shown, the inlet connection 39 may include a substantially crescent or segment shaped scoop or housing portion 42 as shown in Figs. 1 and 2 of the drawings. The scoop 42 is located so that the tips of the blades of the impeller 25 will travel therethrough in a direction to cause cold air to be delivered into the conduit 30 through the inlet 39.

At a point between the inlet connections 39 and 40, the conduit 30 is provided with a valve housing 43 in which a mixing valve 44 is located. The valve 44 is adapted to be shifted by means of an actuating knob 45 connected therewith and located on the instrument panel 16. When the valve 44 occupies the full line position shown in Fig. 1 the cold air inlet connection 39 is closed while the conduit 30 is in open communication with the delivery section 28b of the structure 28 through the warm air connection 40. When the valve 44 is moved to the broken line position shown in Fig. 1 the warm air inlet 40 is closed while the cold air inlet 39 is opened. If the valve 40 is set at a position between its full line and broken line positions the cold and warm air inlets 39 and 40 will be partially open and a mixture of cold and warm air will be supplied to the conduit 30 for delivery to the compartment 11.

The impeller 25 should be capable of delivering a volume of air which will be sufficient under all conditions of vehicle operation to provide the necessary amount of cooling for the engine 17 and to also provide the amount of air desired for ventilating and conditioning the compartment 11. Under certain conditions the volume of air required for proper cooling of the engine 17 will be considerably in excess of the volume of air needed or desired for the compartment 11 and this excess air is discharged from the structure 28 after passage through the radiator 19.

For this purpose the delivery section 28b of the structure 28 is provided with the above mentioned discharge openings 29. The discharge openings 29 are preferably located so that the air which is discharged therefrom will be directed rearwardly against, and will flow over, the engine 17. The discharge openings 29 are controlled by pivotally mounted valves or shutters 48. These valves are connected with an actuating member 49 in the form of an upright bar to which a tension spring 50 is connected. The spring 50 exerts a downward pull on the bar 49 tending to move the valves 48 toward their closed position.

The extent of opening of the valves 48 is preferably regulated or varied automatically in response to changes in the temperature of the radiator 19 or of the water in the cooling passages of the engine 17 and both of which are indicative of the operating temperature of the engine. For this purpose an expansible temperature responsive device 51 is located in the delivery section 28b of the structure 28 and is connected with the lower end of the actuating bar 49. The expansible device 51 here shown as being located immediately adjacent the radiator 19 so that when the radiator has been heated to a predetermined temperature the valves 48 will be opened to permit a greater volume of air to be delivered through the openings of the radiator by the impeller 25 to increase the cooling effect on the engine 17. When the temperature responsive device 51 is located immediately adjacent the radiator 19, as here shown, it is directly responsive to temperature changes in the radiator and is also indirectly responsive to temperature changes in the engine 17.

As indicated in the early part of this specification, the cooling fan often absorbs a substantial part of the horsepower developed by the vehicle engine, and under certain conditions of operation, power is wasted by reason of the fact that the fan is operated either at an excessive speed or at times when it is not needed. The present invention deals with this problem by incorporating in the driving means for the impeller 25 the above mentioned coupling 53 which operates to permit the speed of the impeller to be varied automatically in accordance with the cooling requirements of the engine 17. The coupling 53 is here shown as being in the form of a magnetic coupling which is operable with slippage and which, when energized to its normal extent, provides a substantially constant speed coupling for the impeller 25.

As shown in Fig. 4, the coupling 53 comprises a housing 54 formed of magnetic material and a rotor 55 located in the housing and also formed of magnetic material. The housing 54 is mounted on suitable bearings 54a so as to be freely rotatable on the impeller shaft 56. The rotor 55 and a pulley 57 are pinned or keyed to the shaft 56 as indicated at 55a and 57a, and the rotor carries an energizing coil or winding 58. The belt 26 extends around the pulley 57 and connects the same with the power take-off 18. The impeller 25 is suitably mounted on the housing 54 so as to be rotatable therewith. Energizing current from the storage battery 59 of the vehicle is supplied to the coil 58 through a circuit which includes slip rings 60 and 61 carried by the shaft 56 and brushes 60a and 61a cooperating with such slip rings. One or more constructions suitable for the magnetic coupling 53 are illustrated and described in greater detail in Patent No. 2,106,542, granted January 25, 1938.

For rendering the energization of the coupling 53 responsive to the temperature of the engine 17, the energizing circuit for the coupling is provided with a temperature responsive switch 62 which is located on or adjacent the engine. As shown in Fig. 3, the temperature responsive switch 62 may comprise a thermally responsive element or expansible member 63 disposed in the water space of the engine 17 and having an actuating stem 64 which cooperates with a plurality of movable switch contacts. In this instance these switch contacts comprise paired cooperating contacts 65, 66 and 67. A resistance 68 is connected with these contacts so that when the pair of contacts 66 are closed a portion of the resistance will be short-circuited and when the two pairs of contacts 66 and 67 are closed the entire resistance will be short-circuited. One of the contacts 65 is connected with the brush 60a of the coupling 53 by a conductor 69 and one of the contacts 67 is connected with the vehicle battery 59 by a connection 70 which includes a key-controlled switch 71 such as the usual ignition switch of the vehicle.

When the vehicle 10 is placed in operation with the engine 17 and the radiator 19 in a cold condition, all of the contacts 65, 66 and 67 will be open and the coupling 53 will be deenergized. While the coupling remains deenergized the slippage between the housing 54 and the rotor 55 will be substantially one hundred percent and the impeller 25 will not be driven and hence there will be substantially no cooling air flowing through the radiator 19. At this time the valves 48 will be held in their closed position by the spring 50. When the temperature of the engine 17 increases a predetermined amount, the stem 64 of the temperature responsive switch 62 will close the first pair of contacts 65 thereby closing the energizing circuit for the coupling 53 in a manner such that the energizing circuit includes the resistance 68.

While the coupling 53 is thus initially or partially energized it will operate with considerable slippage and the impeller 25 will be driven at a relatively reduced speed which will be substantially constant for all operating speeds of the engine coming within its normal driving range. The operation of the impeller at the relatively reduced speed will cause a flow of air through the radiator 19 for cooling the engine 17 and either warm or cold air or a mixture thereof will then be delivered to the compartment 11 through the conduit 30. As the temperature of the engine 17 increases further, the stem 64 of the thermostatic switch 62 will cause the second pair of contacts 66 to be closed also. This results in a portion of the resistance 68 being short-circuited out of the energizing of the circuit for the coupling 53. The energization of the coupling is thereby increased and the slippage of the coupling is correspondingly decreased and the impeller 25 is driven at a relatively higher speed. The condition of operation for the vehicle in which the pairs of contacts 65 and 66 are closed represents the normal operating condition during which the impeller 25 will cause a sufficient flow of air through the radiator 19 to provide the required amount of cooling for the engine and will also supply to the compartment 11 the volume of air needed for the ventilation or heating thereof.

If the vehicle 10 is operated under conditions of increased or abnormal load such as when climbing a hill, the temperature of the engine may increase further and thereupon the stem 64 of the temperature responsive switch 62 will cause the third pair of contacts 67 to be closed. This will short-circuit the remaining portion of the resistance 68 out of the energizing circuit and the coupling 53 will then operate in an over excited condition and its slippage will be still further reduced and the impeller 25 will be driven at its maximum speed. The impeller 25 will then deliver an increased volume of air through the radiator 19 to provide the additional cooling affect needed by the engine 17. When the operating condition of the vehicle returns to normal, the contacts 67 open to reinsert a portion of the resistance 68 into the energizing circuit of the coupling 53 and thereafter the cooling effect of the impeller 25 is automatically controlled by the opening and closing of the contacts 66 in response to changes in the temperature of the engine.

As mentioned above, the coupling 53 is a substantially constant speed coupling and in this connection it should be explained that the inherent characteristics of this coupling are such that even though the speed of the engine 17 varies within the normal driving range of the vehicle, the speed of the impeller 25 will be a substantially constant speed depending upon the extent of energization of the coupling which has been determined or selected by the paired contacts 65, 66 and 67 of the temperature responsive switch 62. In other words, the slippage of the coupling 53 will be such that not withstanding variations in the operating speed of the engine 17 the impeller 25 will be driven at a substantially constant speed for each of the three selected degrees of energization represented by the pairs of contacts 65, 66 and 67. During operation of the impeller at each of these selected substantially constant speeds, the coupling 53 operates with continuous slippage which varies in amount as changes take place in the speed or R. P. M. of the engine 17.

As shown in the drawings, the conduit 30 may be provided with means for absorbing or reducing objectionable noises and vibrations from the stream of air being delivered to the compartment 11. Such means is here shown as comprising a silencer 73 having a chamber surrounding the conduit and containing a fibrous or cellular sound absorbing material 74. The portion of the conduit extending through the silencer is provided with openings or perforations 75 leading to the sound absorbing material 74.

Fig. 5 of the drawings shows ventilating and heating apparatus generally similar to that just described above and in which corresponding parts have been designated by the same reference characters. The apparatus of Fig. 5 shows another way in which the valves 48 are adapted to be opened in response to a predetermined increase in the operating temperature of the engine 17. This is accomplished by providing a temperature response bulb 77 in the water space of the engine and which is connected with an expansible device 78 by means of the tube 79. When the temperature of the engine 17 increases to a point where the air being delivered to the compartment 11 of the vehicle provides insufficient cooling for the engine, pressure will be developed in the device 78 and will actuate the bar 49 to open the valves 48. In this arrangement the actuation of the valves 48 is directly responsive to temperature changes of the engine 17 instead of indirectly responsive as in the arrangement of Fig. 1.

Fig. 6 shows another modified construction in which the hollow structure 28 is connected with the vehicle compartment in a somewhat different manner than is shown in Figs. 1 and 5. In this modified construction a conduit 81 extending rearwardly to the vehicle compartment 82 includes cold and warm air inlet connections 83 and 84 similar to the connections 39 and 40, and also includes a mixing valve 85 similar to the valve 44 of Fig. 1. The valve 85 differs from the mixing valve 44 in that it is actuated automatically so as to control the inlet connections 83 and 84 in accordance with the requirements of the compartment 82.

For purposes of this automatic actuation of the mixing valve 85, a temperature responsive bulb 86 is located at a suitable point in the compartment 82 and is connected with an expansible valve-actuating element 87 by means of the tube 88. The expansible element 87 is operably connected with an arm or lever 89 of the valve 85 and when the temperature of the compartment 82 increases a predetermined amount, the valve will be shifted from its full line position toward its broken line position to decrease or cut-off the amount of warm air being supplied through the connection 84 and correspondingly increase the amount of cold air being supplied through the connection 83. Similarly, when the temperature of the compartment 82 falls, the valve 85 will be shifted from its broken line position toward its full line position by the action of the compression spring 90 to thereby increase the supply of warm air and decrease or cut off the supply of cold air being supplied through the connection 83. The discharge end of the conduit 81 opens into the vehicle compartment 82 either directly or through a discharge box or fitting 91 similar to the box 32 of Fig. 1. A windshield clearing or defrosting connection 92 extends from the box 91 and is controlled by a valve 93 adapted to be actuated by a knob 94.

The operation of the automatic temperature responsive means for actuating the mixing valve 85 can be varied or adjusted to suit the requirements of the compartment 82 and, for this purpose, an adjusting knob 95 is provided on the instrument panel and is connected with an adjusting screw 96 by means of the flexible actuating member or wire 97. The wire 97 is connected with the screw 96 by means of an arm 98 carried by the latter so that by pushing or pulling on the knob 95 the screw can be oscillated or rotated in an internally threaded bracket or nut 99 through which it extends. The screw 96 forms a seat for the spring 90 and it will be readily seen that by adjusting the screw 96, in the manner just described, will vary or modify the actuation of the valve 85 by the temperature responsive element 87.

The delivery of air through the conduit 81 to the compartment 82 is also controlled by a main valve 101 which is adapted to be manually shifted to an open or closed position by an actuating knob 102 located on the instrument panel. The valve 101 serves to close the conduit 81 at times when a delivery of air to the compartment 82 is not desired. The valve 101 and its actuating knob 102 thus provide an additional means for controlling the air supply or for overruling the control exercised by the mixing valve 85 and the temperature responsive actuating element 87 of the latter.

Fig. 7 of the drawings shows still another modification of the improved ventilating and heating apparatus of the present invention. In this modified arrangement a hollow structure 105, corresponding with the hollow structure 28, is connected with the cooling radiator 106 of the vehicle engine 107. The structure 105 is located entirely to the rear of the radiator and is connected with the vehicle compartment 108 by means of an air delivery conduit 109. As here shown, the hollow structure 105 includes a flared hood portion 105a which forms a passage for the air which flows through the openings of the radiator 106, and a housing portion 105b in which an air impeller or blower 110 operates. In this instance the impeller 110 is of the centrifugal type and the housing portion 105b has a discharge connection or nozzle 111 through which the air is delivered by the impeller and which also forms an inlet connection for the conduit 109.

The delivery end of the conduit 109 communicates with the vehicle compartment 108 either directly or through a suitable box or fitting 112 having a discharge opening 113. The discharge opening 113 is controlled by a suitable valve 114 adapted to be actuated by a knob 115 located on the instrument panel 116. A connection 117 extending from the box 112 is also provided for clearing or defrosting the windshield 118 and is controlled by a valve 119 which is adapted to be actuated by a knob 120 located on the instrument panel.

The air impeller 110 is driven from a power takeoff 122 of the vehicle engine 107 by means of a belt 123 which also drives the water circulating pump 124 of the engine cooling system. The air which passes through the radiator 106 is discharged by the impeller 110 through the discharge connection 111. At times the air delivered by the impeller 110 will be in excess of that needed by the compartment 108 for ventilating or heating the latter, and to permit the escape of such excess air, the discharge connection 111 is provided with a discharge opening 125 leading to atmosphere and controlled by a valve 126 which functions as a pop-off valve and is normally urged toward its closed position by a tension spring 127. The discharge opening 125 and the control valve 126 correspond with the discharge openings 29 and the control valves 48 of the apparatus illustrated in Figs. 1 and 5.

The drive for the air impeller 110 includes a coupling 129 which is substantially identical with the magnetic coupling 53 above described and which operates with more or less slippage depending upon the extent of energization of the coupling. The impeller 110 is carried by the rotatable housing of the magnetic coupling 129 and corresponds with the impeller 25 of Figs. 1, 3 and 5. The operation of the coupling 129 is automatically responsive to the temperature of the engine 107 and is controlled by an energizing circuit illustrated in Fig. 8 and which is substantially identical with the energizing circuit provided for the coupling 53 and illustrated in Fig. 3 of the drawings. Since the operation of the coupling 129 and its energizing circuit are substantially the same as described above for the coupling 53 the description thereof need not be here repeated. The same reference characters have been used on the energizing circuit for the coupling 129.

With the apparatus illustrated in Fig. 7 it will be seen that the cooling air which passes through the radiator 106, either as the result of the forward motion of the vehicle or by being drawn through the radiator by the operation of the impeller 110, will be discharged through the connection 111 and will be supplied to the vehicle compartment 108 through the conduit 109. As explained above, if the air thus delivered through the connection 111 is in excess of that needed for the compartment 108 it is discharged or exhausted to atmosphere through the discharge opening 125.

Instead of the valve 126 of the discharge opening 125 being opened only by the pressure of the air being delivered through the connection 111, it can be opened in a positive manner as shown in the modified construction illustrated in Fig. 9. This modified view shows a corresponding valve 126a controlling a discharge opening 125a and normally urged toward its closed position by a tension spring 127a. The valve 126a is adapted to be engaged and shifted in an opening direction by a stem 131 of an expansible element 132 which is connected with a temperature responsive bulb 133 located in the water space of the vehicle engine 107a. When the temperature of the engine 107a increases to the point where the amount of cooling air needed thereby is in excess of that needed for the compartment 108, the element 132 and the stem 131 carried thereby cause a positive opening of the valve 126a so that the additional cooling air can be more freely exhausted or discharged to atmosphere through the opening 125a.

It should be understood that the main control valve or so-called overruling valve 101 of Fig. 6 can also be used in the forms of the apparatus illustrated in Figs. 1 and 5 if desired.

In all of the various forms of the invention above described the air impelling means includes a rotatable bladed member or fan whose blade elements are disposed in an annular series and are mounted on or connected with the rotatable housing or drum member of the magnetic coupling by which the air impelling means is driven from the power take-off of the vehicle engine.

From the foregoing description and the accompanying drawings it will now be readily understood that the present invention provides improved ventilating and heating apparatus for a vehicle compartment and which makes use of the engine cooling radiator and fan so as to avoid a duplication of apparatus. It will also be seen that the improved apparatus provides for the operation of the cooling fan in a manner such that its speed will be automatically responsive to the operating temperature and cooling requirements of the radiator or engine, and that the horsepower heretofore wastefully expended in driving the cooling fan at an excessive speed or when not needed, will be saved. It will also be seen that the improved apparatus provides for the delivery of a large volume of air of the desired temperature to the vehicle compartment and that the delivery of such air to the compartment is controlled or controllable in accordance with the requirements of the compartment.

While the improved ventilating and heating apparatus of the present invention has been illustrated and described herein in considerable detail it will be understood, of course, that the invention is not to be regarded as correspondingly limited in scope but includes all changes and modifications coming within the spirit of the invention and the scope of the appended claims.

Having thus described my invention, I claim:

1. In conditioning apparatus for a vehicle having a passenger compartment and a driving engine, the latter being provided with an auxiliary power take-off and a cooling radiator having numerous openings for a flow of air therethrough in heat-exchange relation thereto, a hollow structure connected with said radiator so as to define a passage for the air which passes through the radiator, said structure including a substantially segment-shaped housing portion in front of the radiator and an outlet housing portion at the rear of the radiator, a conduit extending from said structure to said compartment and opening into the latter, said conduit having cold and warm air inlet connections with said segment-shaped housing portion and said outlet housing portion respectively, air impelling means connected with said power take-off and operable to cause air to flow through said radiator and through said conduit, said impelling means including a fan having an annular series of blades adapted to sweep through said segment-shaped housing portion, an outlet for discharging air delivered by said impelling means in excess of that needed for said compartment, valve means controlling said outlet, a spring biasing said valve means toward a closed position, and temperature responsive means for opening said valve means in accordance with a predetermined change in the operating temperature of the engine.

2. In conditioning apparatus for a vehicle having a passenger compartment and a driving engine, the latter being provided with an auxiliary power take-off and a radiator having numerous openings for the passage of air in heat-exchange relation thereto, a hollow structure connected with said radiator so as to define a passage for the air which passes through the radiator, a conduit extending from said structure to said compartment and opening into the latter, said conduit having inlet connections communicating with said structure at points in front of and to the rear of said radiator, air impelling means operable to cause air to flow through said radiator and through said conduit into said compartment, means connecting said air impelling means with said power take-off including an electromagnetic coupling which is operable with slippage while energized, an energizing circuit for said coupling, valve means for controlling the flow of air from said structure into said conduit through said inlet connections, an outlet for discharging air delivered by said impelling means in excess of that needed for said compartment, and valve means controlling said outlet and operable in response to a predetermined change in the operating temperature of the engine.

3. In conditioning apparatus for a vehicle having a passenger compartment and a driving engine provided with a cooling radiator and an auxiliary power take-off, said radiator having numerous openings for a flow of air therethrough in heat-exchange relation thereto, a hollow structure connected with said radiator so as to define a passage for the air which passes through the radiator, a conduit extending from said hollow structure to said compartment and opening into the latter, air impelling means operable to cause air to flow through said radiator and through said conduit, means connecting said air impelling means with said power take-off including a magnetic coupling which is operable with slippage, an energizing circuit for said magnetic coupling, control means in said circuit responsive to changes in the operating temperature of said engine, said control means being operable to increase the extent of energization of the coupling and reduce the slippage thereof as the temperature of said engine increases, and a valve controlled outlet for discharging air delivered by said impelling means in excess of that needed for said compartment.

4. In conditioning apparatus for a vehicle having a passenger compartment and a driving engine provided with a cooling radiator and an auxiliary power take-off, said radiator having numerous openings for a flow of air therethrough in heat-exchange relation thereto, a hollow structure connected with said radiator so as to define a passage for the air which passes through the radiator, a conduit extending from said hollow structure to said compartment and opening into the latter, air impelling means operable to cause air to flow through said radiator and through said conduit, means connecting said air impelling means with said power take-off including a magnetic coupling which is operable with slippage, an energizing circuit for said magnetic coupling, control means in said circuit responsive to changes in the operating temperature of said engine, said control means being operable to increase the extent of energization of the coupling and reduce the slippage thereof as the temperature of said engine increases, an outlet for discharging air delivered by said impelling means in excess of that needed for said compartment, valve means controlling said outlet, and means for opening said valve means in response to a predetermined change in the operating temperature of said engine.

5. In conditioning apparatus for a vehicle having a passenger compartment and a driving engine provided with a cooling radiator and an auxiliary power take-off, said rdiator having numerous openings for flow of air therethrough in heat-exchange relation thereto, a hollow structure connected with said radiator so as to define a passage for the air which passes through the radiator, said hollow structure including a housing portion located ahead of the radiator and a delivery portion located at the rear of the radiator, a conduit extending from said structure to said compartment and opening into the latter, said conduit having cold and warm air inlet connections communicating with said housing and delivery portions of said structure, air impelling means operable in said housing portion and adapted to cause a flow of air through said radiator and a flow of air to said compartment through said inlet connections and conduit, valve means controlling the flow of cold and warm air through said inlet connections, means for driving said air impelling means from said power take-off, an outlet for said delivery portion for discharging air delivered by said impelling means in excess of that needed for said compartment, and valve means controlling said outlet and adapted to be opened in response to a predetermined change in the operating temperature of said engine.

6. In conditioning apparatus for a vehicle having a passenger compartment and a driving engine provided with a cooling radiator and an auxiliary power take-off, said radiator having numerous openings for a flow of air therethrough in heat-exchange relation thereto, a hollow structure connected with said radiator so as to define a passage for the air which passes through the radiator, said hollow structure including a housing portion located ahead of the radiator and a delivery portion located at the rear of the radiator, a conduit extending from said structure to said compartment and opening into the latter, said conduit having cold and warm air inlet connections communicating with said housing and delivery portions of said structure, air impelling means operable in said housing portion and adapted to cause a flow of air through said radiator and a flow of air into said compartment through said inlet connections and conduit, valve means controlling the flow of cold and warm air through said inlet connections, means for driving said air impelling means from said power take-off including a magnetic coupling which is operable with slippage, an energizing circuit for said magnetic coupling, control means in said circuit responsive to changes in the operating temperature of said engine, said control means being operable to increase the extent of energization of the coupling and reduce the slippage thereof as the temperature of said engine increases, an outlet for said delivery portion for discharging air delivered by said impelling means in excess of that needed for said compartment, and valve means controlling said outlet and adapted to be opened in response to a predetermined change in the operating temperature of said engine.

HOWARD J. FINDLEY.

REFERENCES CITED

The following references are of record in the file of this patent:

UNITED STATES PATENTS

| Number | Name | Date |
|---|---|---|
| 591,395 | Fay | Oct. 12, 1897 |
| 704,574 | Pintsch | July 15, 1902 |
| 765,078 | Jigouzo | July 12, 1904 |
| 1,000,183 | Marelli | Aug. 8, 1911 |
| 1,833,324 | Kennewig | Nov. 24, 1931 |
| 2,006,840 | Mueller | July 2, 1935 |
| 2,019,476 | Brownlee | Nov. 5, 1935 |
| 2,079,859 | Hueber | May 11, 1937 |
| 2,101,627 | Nallinger | Dec. 7, 1937 |
| 2,255,420 | Graham | Sept. 9, 1941 |

FOREIGN PATENTS

| Number | Country | Date |
|---|---|---|
| 229,012 | Great Britain | Feb. 19, 1925 |
| 425,830 | Great Britain | Mar. 22, 1935 |
| 609,282 | Germany | Feb. 11, 1935 |